(12) United States Patent
Wu et al.

(10) Patent No.: US 12,106,451 B2
(45) Date of Patent: Oct. 1, 2024

(54) BLOCK-BASED NOISE REDUCTION INTENSITY DETERMINATION METHOD AND DEVICE

(71) Applicant: Cvitek Co. Ltd., Beijing (CN)

(72) Inventors: Jen-Shi Wu, Zhubei (TW); Hsin-Hui Chen, Taipei (TW)

(73) Assignee: Cvitek Co. Ltd., Beijing (CN)

( * ) Notice: Subject to any disclaimer, the term of this patent is extended or adjusted under 35 U.S.C. 154(b) by 366 days.

(21) Appl. No.: 17/574,396

(22) Filed: Jan. 12, 2022

(65) Prior Publication Data
US 2022/0237746 A1 Jul. 28, 2022

(30) Foreign Application Priority Data
Jan. 22, 2021 (CN) .......................... 202110087876.4

(51) Int. Cl.
*G06T 5/70* (2024.01)

(52) U.S. Cl.
CPC ...... *G06T 5/70* (2024.01); *G06T 2207/20012* (2013.01); *G06T 2207/20021* (2013.01); *G06T 2207/20024* (2013.01)

(58) Field of Classification Search
CPC .......................... G06T 5/50; G06T 5/70; G06T 2207/20004–20012; G06T 2207/20021; G06T 2207/20024
See application file for complete search history.

(56) References Cited

U.S. PATENT DOCUMENTS

| | | | |
|---|---|---|---|
| 5,491,519 A * | 2/1996 | Kim | H04N 19/80 375/E7.193 |
| 8,447,130 B2 | 5/2013 | Chiu | |
| 8,553,783 B2 | 10/2013 | Deng et al. | |
| 9,111,338 B2 | 8/2015 | McCarthy et al. | |
| 9,374,506 B2 | 6/2016 | Biswas et al. | |
| 9,569,821 B2 | 2/2017 | Takahashi et al. | |
| 9,721,330 B2 | 8/2017 | Chen et al. | |
| 2005/0271298 A1 * | 12/2005 | Yu | G06T 5/70 382/286 |
| 2007/0109448 A1 * | 5/2007 | Winger | H04N 5/21 348/E5.077 |

(Continued)

FOREIGN PATENT DOCUMENTS

EP 1383311 B1 8/2006

OTHER PUBLICATIONS

Rusanovskyy, Dmytro, Kostadin Dabov, and Karen Egiazarian. "Moving-window varying size 3D transform-based video denoising." Proc. of 2nd International Workshop on Video Processing and Quality Metrics for Consumer Electronics, VPQM'06. 2006. (Year: 2006).*

*Primary Examiner* — Geoffrey E Summers
(74) *Attorney, Agent, or Firm* — Innovation Counsel LLP

(57) ABSTRACT

An image processing method includes the following steps. Firstly, a block-size value is obtained. Then, a first frame into a plurality of first blocks according to the block-size value is divided. Then, a second frame into a plurality of second blocks according to the block-size value is divided. Then, a noise reduction intensity array is obtained according to a first pixel information of each first block and a second pixel information of each second block. Then, an output frame is obtained according to the noise reduction intensity array, the first frame and the second frame.

12 Claims, 5 Drawing Sheets

(56) References Cited

U.S. PATENT DOCUMENTS

| | | | |
|---|---|---|---|
| 2009/0096932 A1* | 4/2009 | Lee | G09G 3/204 |
| | | | 348/E5.062 |
| 2014/0247365 A1 | 9/2014 | Gardner et al. | |
| 2016/0366309 A1 | 12/2016 | Douady-Pleven et al. | |
| 2020/0084460 A1* | 3/2020 | Li | H04N 19/14 |
| 2020/0099944 A1* | 3/2020 | Chen | H04L 47/29 |

* cited by examiner

BLOCK-BASED NOISE REDUCTION INTENSITY DETERMINATION METHOD AND DEVICE

This application claims the benefit of People's Republic of China application Serial No. 202110087876.4, filed on Jan. 22, 2021, the subject matter of which is incorporated herein by reference.

BACKGROUND OF THE INVENTION

Field of the Invention

The invention relates in general to a processing method and a processing device using the same, and more particularly to an image processing method and an image processing device using the same.

Description of the Related Art

The captured frame is generally affected by changes in the environment, the camera itself and the motion of the captured object, and thus there is the pixel information difference between the captured frame and the previous frame, wherein the pixel information difference is caused by noise or the motion of the captured object. In order to obtain a clearer frame, noise reduction is generally performed on the captured frame. However, when the noise reduction effect is strong, the noise could be reduced together with the pixel information corresponding to the action of the captured object, resulting in a blurry frame after the noise reduction. When the noise reduction effect is weak, the noise could not be effectively reduced. Therefore, the industry believes that it is necessary to study a new image processing method and an image processing device using the same to improve the aforementioned conventional problems.

SUMMARY OF THE INVENTION

The invention is directed to an image processing method and an image processing device using the same capable of resolving the problems disclosed above.

According to an embodiment of the present invention, an image processing method is provided. The image processing method includes the following steps: obtaining a block-size value; dividing a first frame into a plurality of first blocks according to the block-size value; dividing a second frame into a plurality of second blocks according to the block-size value; obtaining a noise reduction intensity array according to a first pixel information of each first block and a second pixel information of each second block; and obtaining an output frame according to the noise reduction intensity array, the first frame and the second frame.

The image processing device includes a block-size value obtainer and a noise reducer. The block-size value obtainer is configured to obtain a block-size value. The noise reducer is configured to: divide a first frame into a plurality of first blocks according to the block-size value; divide a second frame into a plurality of second blocks according to the block-size value; obtain a noise reduction intensity array according to a first pixel information of each first block and a second pixel information of each second block; and obtain an output frame according to the noise reduction intensity array, the first frame and the second frame.

The above and other aspects of the invention will become better understood with regard to the following detailed description of the preferred but non-limiting embodiment (s). The following description is made with reference to the accompanying drawings.

DETAILED DESCRIPTION OF THE INVENTION

Detailed descriptions of the invention are disclosed below with embodiments accompanying drawings. However, the descriptions are for exemplary purpose only, not for limiting the scope of protection of the present invention.

Figure 1:
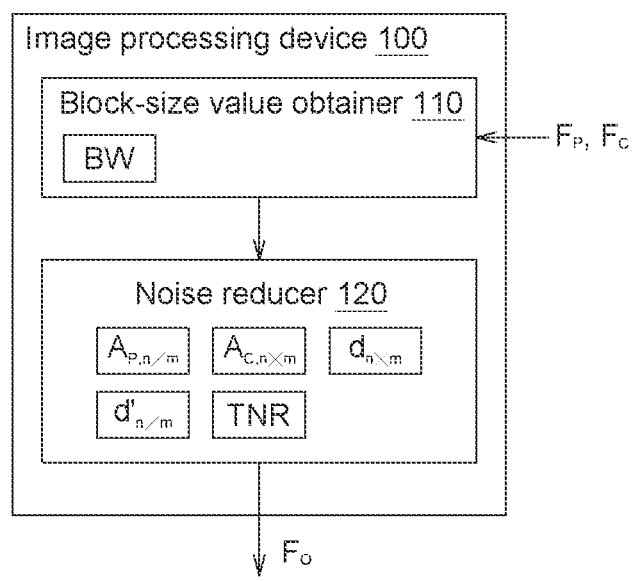
FIG. 1 shows a functional block diagram of an image processing device according to an embodiment of the present invention.
Figure 2:
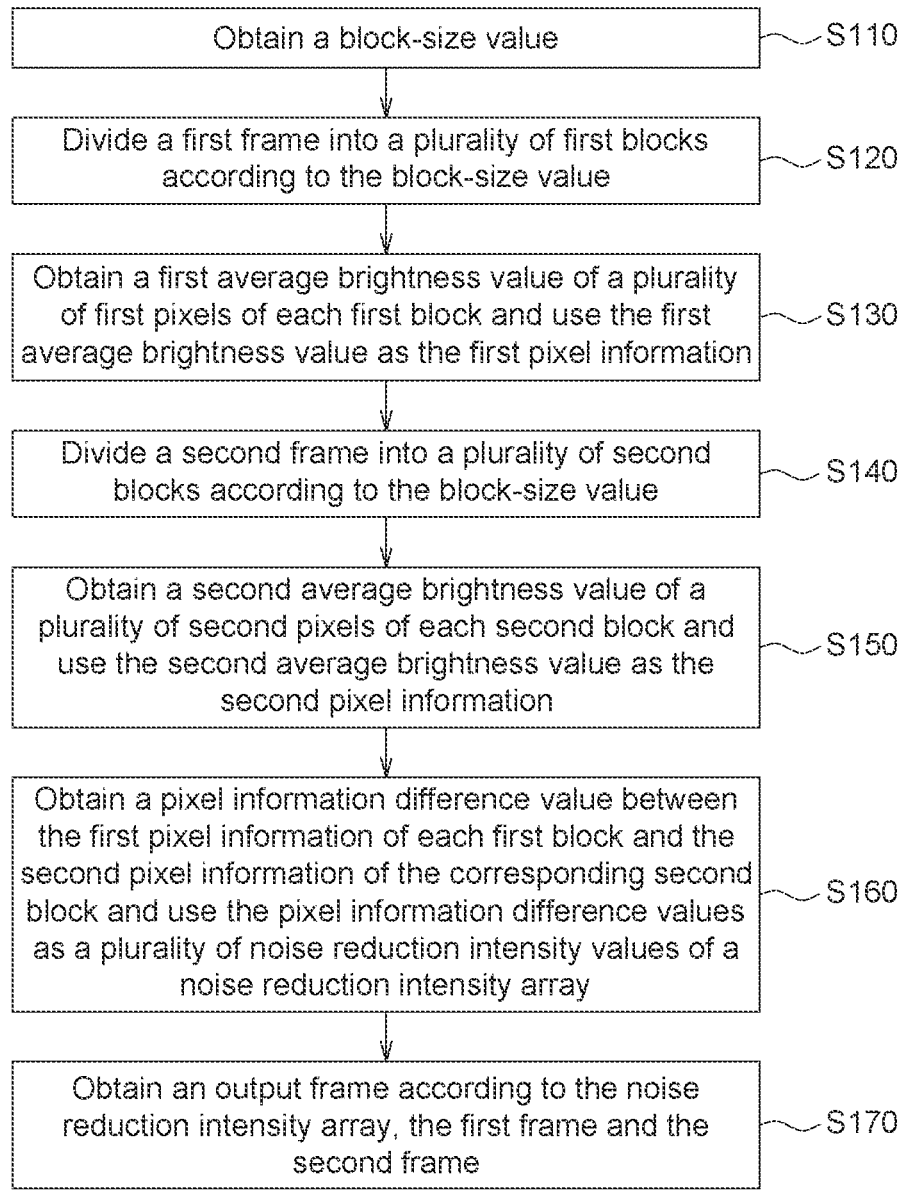
FIG. 2 shows a flowchart of an image processing method of the image processing device of FIG. 1.
Figure 3:
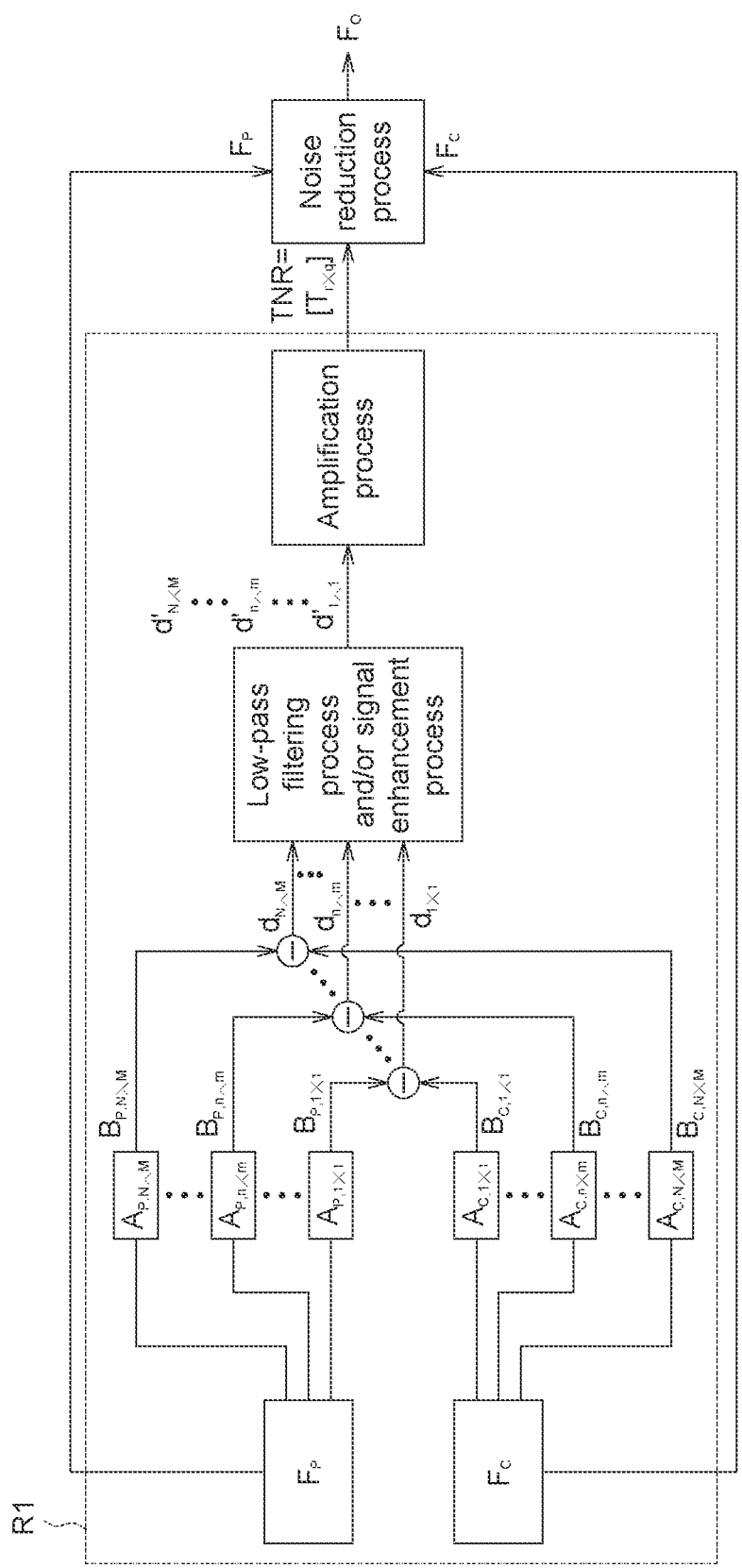
FIG. 3 shows a functional block diagram of the image processing function of the image processing device of FIG. 1.
Figure 4:
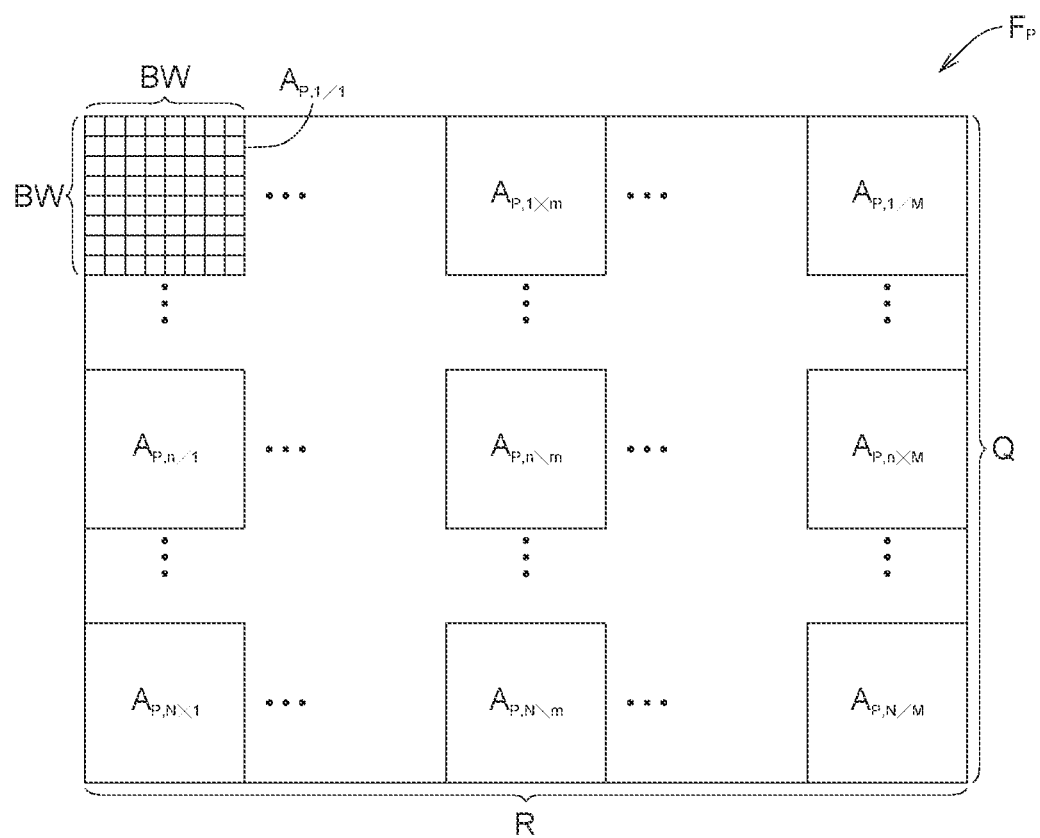
FIG. 4 shows a schematic diagram of a first frame of FIG. 3.

Referring to FIGS. 1 to 4, FIG. 1 shows a functional block diagram of an image processing device 100 according to an embodiment of the present invention, FIG. 2 shows a flowchart of an image processing method of the image processing device 100 of FIG. 1, FIG. 3 shows a functional block diagram of the image processing function of the image processing device 100 of FIG. 1, and FIG. 4 shows a schematic diagram of a first frame (or picture, image) $F_P$ of FIG. 3.

The image processing device 100 includes a block-size value obtainer 110 and a noise reducer 120. The image processing device 100 is, for example, various electronic devices capable of image processing, such as a camera, a notebook computer, a desktop computer, a tablet computer and a communication device (for example, a mobile phone).

The block-size value obtainer 110 and the noise reducer 120 could be, for example, a physical circuit formed by a semiconductor manufacturing process, wherein the physical circuit is such as a semiconductor chip, a semiconductor package, etc. In addition, the block-size value obtainer 110 and the noise reducer 120 could be integrated into a single component, or the block-size value obtainer 110 and/or the noise reducer 120 could be integrated into a processor or a controller.

In an embodiment, the block-size value obtainer 110 is configured to: (a) obtain a block-size value BW. The noise reducer 120 is configured to: (b) divide the first frame $F_P$ into a plurality of first blocks $A_{P,n \times m}$ according to the block-size value BW; (c) divide the second frame $F_C$ into a plurality of second blocks $A_{C,n \times m}$ according to the block-size value BW; (d) obtain a noise reduction intensity array TNR according to a first pixel information $B_{P,n \times m}$ of each first block $A_{P,n \times m}$ and a second pixel information $B_{C,n \times m}$ of each second block $A_{C,n \times m}$; and (e) obtain an output frame $F_O$ according to the noise reduction intensity array TNR, the first frame $F_P$ and the second frame $F_C$. As a result, compared with the conventional noise reduction method for each pixel, the embodiment of the present invention divides the frame into multiple blocks and processes them individually, and accordingly it could improve the noise reduction capability and the noise reduction effect. The larger the block-size value BW is, the higher the noise reduction capability is.

The following is a further description of the process of the image processing method (or noise reduction method) with reference to FIG. 2.

In step S110, the block-size value obtainer 110 obtains the block-size value BW. For example, the block-size value obtainer 110 could use the following formula (1) to obtain the block-size value BW. In formula (1), α represents an adjustment value for noise floor, wherein the adjustment value could be any real number equal to or greater than 1, σ represents a noise intensity value, and $d_C$ represents a noise judgment critical value.

$$BW \cong (\alpha \times \sigma)/d_c \quad (1)$$

The noise intensity value σ is, for example, a standard deviation, and the value of the noise intensity value σ could depend on the characteristics of the camera that captures (photographs) the first frame $F_P$ and the second frame $F_C$ and/or the capturing environment (for example, ambient light). The aforementioned camera could be the image processing device 100. The noise intensity value σ could be obtained by measuring the characteristics of the image processing device 100. However, as long as the noise intensity value σ could be obtained, the embodiment of the present invention does not limit the method of measuring the characteristics of the image processing device 100.

The noise judgment critical value $d_C$ is, for example, the critical value at which the change of the frame pixel information belongs to (or tend to) to noise or the pixel dynamic change. The term "pixel dynamic change" is, for example, caused by the motion of the captured object. In an embodiment, the noise judgment critical value $d_C$ could be a pixel information difference value. In case of the pixel information being the brightness which is set to 16, when the difference between the pixel brightness of the first frame $F_P$ and the pixel brightness of the second frame $F_C$ exceeds 16 levels (the gray scale value is, for example, a total of 255 levels), it means it is possible that the pixel information difference of the second frame $F_C$ could be caused by the pixel dynamic change. When the difference between the pixel brightness of the first frame $F_P$ and the pixel brightness of the second frame $F_C$ does not exceed 16 levels, it means it is possible that the pixel information difference of the second frame $F_C$ could be caused by noise. The embodiment of the present invention does not limit the noise judgment critical value $d_C$, and it could depend on the captured object and/or the capturing environment.

The adjustment value α, the noise intensity value σ and the noise judgment critical value $d_C$ could be obtained or set in advance before executing the image processing procedure. When the capturing environment and/or camera remain unchanged (for example, maintain the original state), the adjustment value, the adjustment value α, the noise intensity value σ and the noise judgment critical value $d_C$ could remain unchanged (for example, maintain the original state).

In step S120, the noise reducer 120 divides the first frame $F_P$ into N×M first blocks $A_{P,n \times m}$ according to the block-size value BW, wherein the subscript n is a positive integer ranging between 1 and N, and the subscript m is between a positive integer ranging between 1 to M. The resolution of each first block $A_{P,n \times m}$ is BW×BW.

As shown in FIG. 4, in case of BW being equal to 8 (that is, the size (or resolution) of each first block $A_{P,n \times m}$ is 8×8) and the resolution of the first frame $F_P$ is 1920×1080, the noise reducer 120 determines the number of the first blocks $A_{P,n \times m}$ according to the following formulas (2) and (3), wherein R and Q represent the resolution (R×Q) of the first frame $F_P$. Accordingly, the obtained N is equal to 240 (calculation formula: 1920/8=240), and M is equal to 135 (calculation formula: 1080/8=135).

$$N=R/BW \quad (2)$$

$$M=Q/BW \quad (3)$$

In step S130, the noise reducer 120 obtains a first average brightness value of a number of first pixels (for example, BW pixels) of each first block $A_{P,n \times m}$ and uses the first average brightness value as the first pixel information $B_{P,n \times m}$. In other words, each first block $A_{P,n \times m}$ uses the first pixel information $B_{P,n \times m}$ to represent the block information of the entire first block $A_{P,n \times m}$.

In step S140, the noise reducer 120 divides the second frame $F_C$ into N×M second blocks $A_{C,n \times m}$ according to the block-size value BW. In case of BW being equal to 8 (that is, the size (or resolution) of each second block $A_{C,n \times m}$ is 8×8) and the resolution of the second frame $F_C$ is 1920× 1080, the noise reducer 120 determines the number of the second blocks $A_{C,n \times m}$ according to the following formulas (2) and (3), wherein the resolution of the second frame $F_C$ is R×Q.

The first frame $F_P$ is, for example, a previous frame, and the second frame $F_C$ is, for example, a current frame. The previous frame could be a frame that has been processed for noise reduction or a frame that has not been processed for noise reduction. The image processing method of the embodiment of the present invention for the previous frame and the next frame belong to a time-domain noise reduction method.

In step S150, the noise reducer 120 obtains the second average brightness value of a number of second pixels of each second block $A_{C,n \times m}$, and uses the second average brightness value as the second pixel information $B_{C,n \times m}$. In other words, each second block $A_{C,n \times m}$ uses the second pixel information $B_{C,n \times m}$ to represent the block information of the entire second block $A_{C,n \times m}$.

In step S160, the noise reducer 120 could obtain the noise reduction intensity array TNR according to the first pixel information $B_{P,n \times m}$ of each first block $A_{P,n \times m}$ and the second pixel information $B_{C,n \times m}$ of each second block $A_{C,n \times m}$.

For example, as shown in FIG. 3, the noise reducer 120 obtains a pixel information difference value $d_{n \times m}$ between the first pixel information $B_{P,n \times m}$ of each first block $A_{P,n \times m}$ and the second pixel information $B_{C,n \times m}$ of the corresponding second block $A_{C,n \times m}$ and uses the pixel information difference value $d_{n \times m}$ as a number of noise reduction intensity values $T_{r \times q}$ of the noise reduction intensity array TNR, wherein the subscript r is a positive integer ranging between 1 and R, and the subscript q is a positive integer ranging between 1 and Q.

In an embodiment, as shown in FIG. 3, the noise reducer 120 could perform low-pass filtering process and/or signal enhancement process on each pixel information difference value $d_{n \times m}$ to obtain the pixel information difference value $d'_{n \times m}$. In terms of the low-pass filtering process, the noise reducer 120 could filter out a part that belongs to the noise (low frequency) of the pixel information difference value $d_{n \times m}$. In terms of signal enhancement process, the noise reducer 120 could enhance a part that belong to the signal of the pixel information difference value $d_{n \times m}$, and the signal part is the part other than the noise part of the pixel information difference value $d_{n\times m}$. After processing, the noise reducer 120 generates N×M pixel information difference values $d'_{n\times m}$.

In an embodiment, as shown in FIG. 3, the noise reducer 120 could perform an amplification process on the pixel information difference value $d'_{n\times m}$ to obtain the noise reduction intensity array TNR having the same size (or resolution) as the first frame $F_P$ or the second frame $F_C$. For example, in case of the resolution being 1920×1080, the noise reducer 120 obtains R×Q noise reduction intensity values $T_{r\times q}$ according to at least one of N×M pixel information difference value $d'_{n\times m}$, and uses R×Q noise reduction intensity values $T_{r\times q}$ to form the noise reduction intensity array TNR.

In step S170, the noise reducer 120 obtains the output frame $F_O$ according to the noise reduction intensity array TNR, the first frame $F_P$ and the second frame $F_C$. For example, the noise reducer 120 obtains the output frame $F_O$ according to the following formula (4).

$$B_{O,r\times q}=(1-T_{r\times q})\times B_{P,r\times q}+(T_{r\times q}\times B_{C,r\times q}) \qquad (4)$$

In formula (4), $T_{r\times q}$ represents the (r×q)-th noise reduction intensity value of the noise reduction intensity array TNR, $B_{P,r\times q}$ represents the pixel information of the (r×q)-th pixel of the first frame $F_P$, and $B_{C,r\times q}$ represents the pixel information of the (r×q)-th pixel of the second frame $F_C$. The noise reduction intensity value $T_{r\times q}$, pixel information $B_{P,r\times q}$, and pixel information $B_{C,r\times q}$ are known (or given) information, so the noise reducer 120 could obtain the pixel information $B_{O,r\times q}$ of the (r×q)-th pixel of the output frame $F_O$ according to formula (4).

The noise reduction intensity value $T_{r\times q}$ is an arbitrary real number ranging between 0 and 1. It could be seen from formula (4) that the larger the noise reduction intensity values $T_{r\times q}$ is, the higher the possibility (degree) that the pixel information change belongs to the dynamic change is, and the pixel information $B_{O,r\times q}$ of the (r×q)-th pixel of the output frame $F_O$ is closer to the pixel information $B_{C,r\times q}$ of the second frame $F_C$ (that is, the lower the degree of noise reduction). On the contrary, the less the noise reduction intensity value $T_{r\times q}$ is, the lower the possibility (degree) that the pixel information change belongs to the dynamic change is, and the pixel information $B_{O,r\times q}$ of the (r×q)-th pixel of the output frame $F_O$ is closer to the pixel information $B_{P,r\times q}$ of the first frame $F_P$ (that is, the larger the degree of noise reduction).

When all (R×Q) pixel information $B_{O,r\times q}$ is obtained, the output frame $F_O$ is completed.

Then, the noise reducer 120 outputs the output frame $F_O$ to a display (not shown) to display the output frame $F_O$. Alternatively, the noise reducer 120 or the controller replaces the second frame $F_C$ with the output frame $F_O$. When the image processing device 100 performs the noise reduction processing on another frame (for example, the next frame or the previously processed output frame $F_O$), the first frame $F_P$ of FIG. 2 could be substituted (or replaced) with the output frame $F_O$ (processed by the noise reduction), and the second frame $F_C$ could be substituted (or replaced) with the said another frame. In another embodiment, the first frame $F_P$ of FIG. 2 could be substituted (or replaced) with the second frame $F_C$ (without noise reduction processing), and the second frame of FIG. 2 could be substituted (or replaced) the said another frame.

The image processing device 100 could process a streaming video according to the aforementioned process, and the streaming video includes several frames, wherein in any two adjacent frames, the current frame could substitute into the second frame $F_C$ of FIG. 2, and the previous frame could substitute into the first frame $F_P$ of FIG. 2, and the previous frame could be the frame processed by the same noise reduction process or the frame without the noise reduction process.

Figure 5:
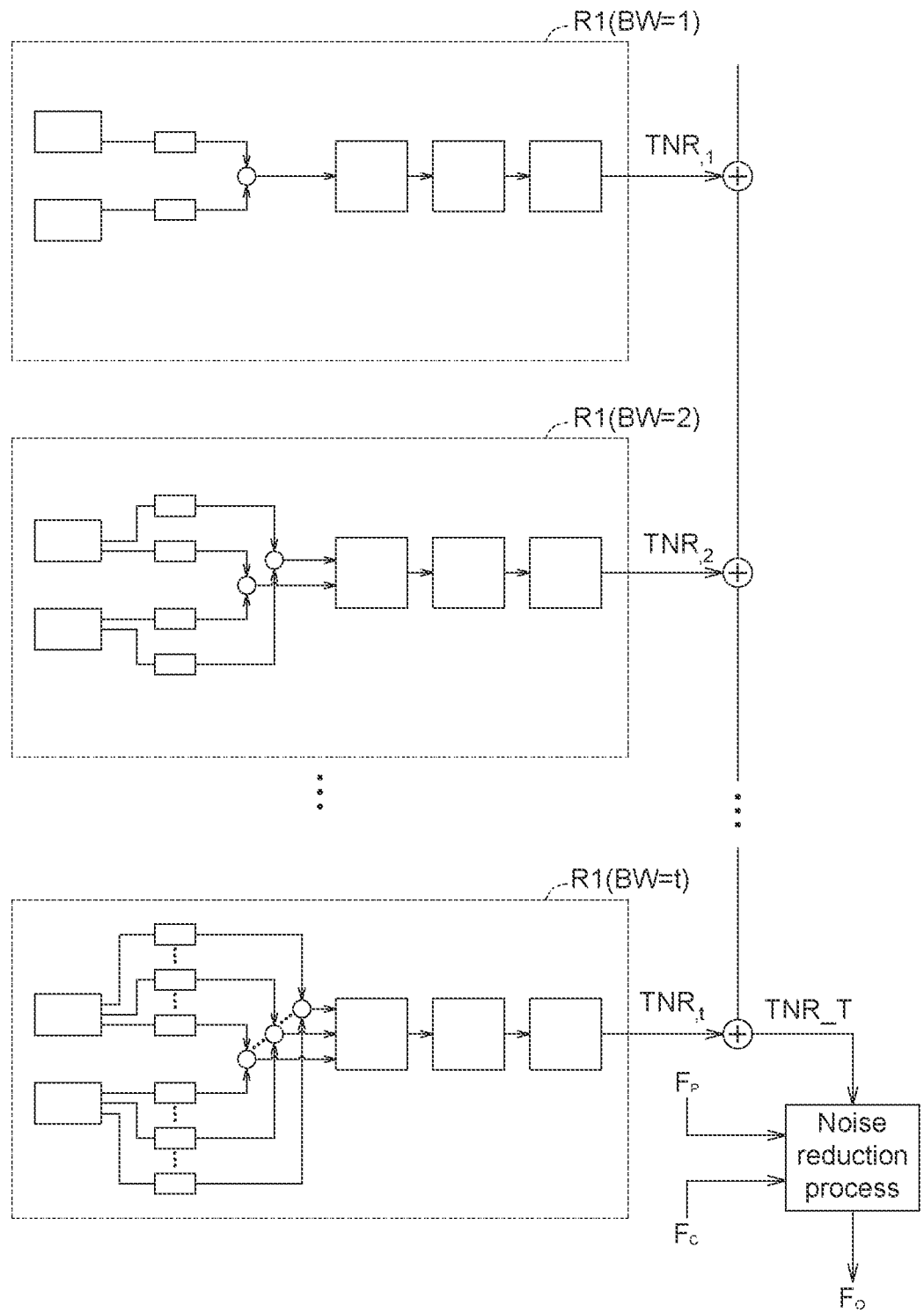
FIG. 5 shows a functional block diagram of the image processing of the image processing device according to another embodiment of the present invention.

Referring to FIG. 5, FIG. 5 shows a functional block diagram of the image processing of the image processing device 100 according to another embodiment of the present invention. The image processing device 100 could perform the noise reduction processing for the second frame $F_C$ according to the several noise reduction intensity arrays $TNR_{,t}$ obtained by several different block-size values BW. The functional block in each dashed frame of FIG. 5 corresponds to the functional block in the dashed frame R1 of FIG. 3.

For example, as shown in FIG. 5, the image processing device 100 executes the same image processing procedure as described above with the block-size value BW which is equal to 1 to obtain the corresponding noise reduction intensity array $TNR_{,1}$. The image processing device 100 executes the same image processing procedure as described above with the block-size value BW which is equal to 2 to obtain the corresponding noise reduction intensity array $TNR_{,2}$. The image processing device 100 executes the same image processing procedure as described above with the block-size value BW which is equal to t to obtain the corresponding noise reduction intensity array $TNR_{,t}$, wherein the subscript "t" is, for example, arbitrary positive integer. The noise reducer 120 could obtain a comprehensive noise reduction intensity array $TNR_{,T}$ according to several noise reduction intensity arrays $TNR_{,t}$. For example, the noise reducer 120 adds several noise reduction intensity arrays $TNR_{,t}$ to obtain the comprehensive noise reduction intensity array $TNR_{,T}$. Then, the noise reducer 120 obtains the output frame $F_O$, by using the above formula (4), according to the comprehensive noise reduction intensity array $TNR_{,T}$, the first frame $F_P$ and the second frame $F_C$. In another embodiment, the method for obtaining the comprehensive noise reduction intensity array is not limited to the addition of several noise reduction intensity arrays, and other mathematical operations (such as addition, subtraction, multiplication, division, averaging or a combination thereof) or equations (formulas) could also be used to obtain the comprehensive noise reduction intensity array $TNR_{,T}$. In addition, the embodiment of the present invention does not limit the total number of the noise reduction intensity array $TNR_{,t}$, and it could be any positive integer equal to or greater than two. In addition, the block-size value BW in FIG. 5 is not limited by the above formula (1). In other words, each block-size value BW in FIG. 5 could be greater than, equal to, or less than the value of $(\alpha\times\sigma)/d_C$.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. An image processing method, comprises:
   obtaining a block-size value;
   dividing a first frame into a plurality of first blocks according to the block-size value;
   dividing a second frame into a plurality of second blocks according to the block-size value;

obtaining a noise reduction intensity array according to a first pixel information of each first block and a second pixel information of each second block; and obtaining an output frame according to the noise reduction intensity array, the first frame and the second frame;

wherein the image processing method further comprises:
obtaining a plurality of the noise reduction intensity arrays according to a plurality of different block-size values;

obtaining a comprehensive noise reduction intensity array of the noise reduction intensity arrays; and obtaining the output frame according to the comprehensive noise reduction intensity array, the first frame and the second frame.

2. The image processing method of claim 1, wherein each block-size value satisfies the following formula;

$$BW \geq (\alpha \times \sigma)/d_c;$$

wherein BW is each block-size value, $\alpha$ is an adjustment value of a noise floor value, $\sigma$ is a noise intensity value, and $d_C$ is a noise judgment critical value.

3. The image processing method of claim 1, further comprising:
obtaining a first average brightness value of a plurality of first pixels of each first block and using the first average brightness value as the first pixel information; and obtaining a second average brightness value of a plurality of second pixels of each second block and using the second average brightness value as the second pixel information;

wherein step of obtaining the noise reduction intensity array comprises:
obtaining a pixel information difference value between the first pixel information of each first block and the second pixel information of the corresponding second block and using the pixel information difference values as a plurality of noise reduction intensity values of each noise reduction intensity array.

4. The image processing method of claim 3, further comprising:
performing a low-pass filter process on the pixel information difference values.

5. The image processing method of claim 3, further comprising:
performing a signal enhancement process on the pixel information difference values.

6. The image processing method of claim 3, further comprising:
performing an amplification process on the pixel information difference values and using the amplified pixel information difference values as a plurality of noise reduction intensity values of each noise reduction intensity array.

7. An image processing device, comprising:
a block-size value obtainer configured to obtain a block-size value; and a noise reducer configured to:
divide a first frame into a plurality of first blocks according to the block-size value;

divide a second frame into a plurality of second blocks according to the block-size value;

obtain a noise reduction intensity array according to a first pixel information of each first block and a second pixel information of each second block; and obtain an output frame according to the noise reduction intensity array, the first frame and the second frame;

wherein the noise reducer is further configured to:
obtain a plurality of the noise reduction intensity arrays according to a plurality of different block-size values;

obtain a comprehensive noise reduction intensity array of the noise reduction intensity arrays; and obtain the output frame according to the comprehensive noise reduction intensity array, the first frame and the second frame.

8. The image processing device of claim 7, wherein each block-size value satisfies the following formula;

$$BW \geq (\alpha \times \sigma)/d_c;$$

wherein BW is each block-size value, $\alpha$ is an adjustment value of a noise floor value, $\sigma$ is a noise intensity value, and $d_C$ is a noise judgment critical value.

9. The image processing device of claim 7, wherein the noise reducer is further configured to:
obtain a first average brightness value of a plurality of first pixels of each first block and use the first average brightness value as the first pixel information;

obtain a second average brightness value of a plurality of second pixels of each second block and use the second average brightness value as the second pixel information; and obtain a pixel information difference value between the first pixel information of each first block and the second pixel information of the corresponding second block and use the pixel information difference values as a plurality of noise reduction intensity values of each noise reduction intensity array.

10. The image processing device of claim 9, wherein the noise reducer is further configured to:
perform a low-pass filter process on the pixel information difference values.

11. The image processing device of claim 9, wherein the noise reducer is further configured to:
perform a signal enhancement process on the pixel information difference values.

12. The image processing device of claim 9, wherein the noise reducer is further configured to:
perform an amplification process on the pixel information difference values and use the amplified pixel information difference values as a plurality of noise reduction intensity values of each noise reduction intensity array.

* * * * *